United States Patent
Arimilli et al.

(10) Patent No.: US 6,574,719 B2
(45) Date of Patent: Jun. 3, 2003

(54) METHOD AND APPARATUS FOR CONCURRENTLY COMMUNICATING WITH MULTIPLE EMBEDDED DYNAMIC RANDOM ACCESS MEMORY DEVICES

(75) Inventors: Ravi Kumar Arimilli, Austin, TX (US); James Stephen Fields, Jr., Austin, TX (US); Sanjeev Ghai, Round Rock, TX (US); Praveen S. Reddy, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/903,720

(22) Filed: Jul. 12, 2001

(65) Prior Publication Data

US 2003/0014606 A1 Jan. 16, 2003

(51) Int. Cl.$^7$ ............................. G06F 12/00; G06F 13/00
(52) U.S. Cl. ..................... 711/167; 711/168; 365/233; 365/144; 713/401; 713/503
(58) Field of Search ................................. 711/167, 168; 365/233, 194; 710/401, 503

(56) References Cited

U.S. PATENT DOCUMENTS 6,044,024 A * 3/2000 Barth et al. ............ 365/189.08
6,393,500 B1 * 5/2002 Thekkath .................... 710/35

* cited by examiner

Primary Examiner—Reginald G. Bragdon
Assistant Examiner—Mehdi Namazi

(57) ABSTRACT

An apparatus for providing concurrent communications between multiple memory devices and a processor is disclosed. Each of the memory device includes a driver, a phase/cycle adjust sensing circuit, and a bus alignment communication logic. Each phase/cycle adjust sensing circuit detects an occurrence of a cycle adjustment from a corresponding driver within a memory device. If an occurrence of a cycle adjustment has been detected, the bus alignment communication logic communicates the occurrence of a cycle adjustment to the processor. The bus alignment communication logic also communicates the occurrence of a cycle adjustment to the bus alignment communication logic in the other memory devices. There are multiple receivers within the processor, and each of the receivers is designed to receive data from a respective driver in a memory device. Each of the receivers includes a cycle delay block. The receiver that had received the occurrence of a cycle adjustment informs the other receivers that did not receive the occurrence of a cycle adjustment to use their cycle delay block to delay the incoming data for at least one cycle.

16 Claims, 6 Drawing Sheets

METHOD AND APPARATUS FOR CONCURRENTLY COMMUNICATING WITH MULTIPLE EMBEDDED DYNAMIC RANDOM ACCESS MEMORY DEVICES

BACKGROUND OF THE INVENTION

1. Technical Field

The present invention relates to memory devices in general, and in particular to embedded dynamic random access memory devices. Still more particularly, the present invention relates to a method and apparatus for concurrently communicating with multiple embedded dynamic random access memory devices.

2. Description of the Prior Art

Embedded dynamic random access memory (DRAM) is a type of integrated circuit having both memory cells and their control circuits formed on a single semiconductor chip. Specifically, a complete embedded DRAM includes a transfer field effect transistor (FET), a capacitor coupled to the transfer FET, and a group of control circuitry. The transfer FET acts as a switch between the lower electrode of the capacitor and a bit line. Therefore, data within the capacitor can be written in or read out.

Embedded DRAMs are capable of transferring a large quantity of data at a very high speed. Because of their relatively high processing speed and storage capacity, embedded DRAMs have been commonly employed in various high-end integrated circuits, such as graphic processors. In addition, embedded DRAMs can provide a processor a faster access to larger capacities of memory at a lower cost than that currently available using conventional static random access memories (SRAMs) and/or electrically erasable programmable read only memories (EEPROMs).

The present disclosure provides a method and apparatus for concurrently communicating with multiple embedded DRAM devices by a processor.

SUMMARY OF THE INVENTION

In accordance with a preferred embodiment of the present invention, a data processing system includes a processor and multiple memory devices coupled to the processor. Each of the memory device includes a driver, a phase/cycle adjust sensing circuit, and a bus alignment communication logic. Each phase/cycle adjust sensing circuit detects an occurrence of a cycle adjustment from a corresponding driver within a memory device. If an occurrence of a cycle adjustment has been detected, the bus alignment communication logic communicates the occurrence of a cycle adjustment to the processor. The bus alignment communication logic also communicates the occurrence of a cycle adjustment to the bus alignment communication logic in the other memory devices. There w are multiple receivers within the processor, and each of the receivers is designed to receive data from a respective driver in a memory device. Each of the receivers includes a cycle delay block. The receiver that had received the occurrence of a cycle adjustment informs the other receivers that did not receive the occurrence of a cycle adjustment to use their cycle delay block to delay the incoming data for at least one cycle.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

In order for a processor to take further advantage of the relatively fast speed of embedded dynamic random access memory (DRAM) devices, it may be desirable for the processor to be able to access multiple embedded DRAM devices concurrently. For example, when implementing an off-chip cache memory for a processor with four separate embedded DRAM devices, each cache line of the cache memory can be divided among each of the four embedded DRAM devices. With such configuration, each cache line data transfer from the off-chip cache memory can be accomplished via one transfer cycle instead of four separate transfer cycles. Sometimes, however, data from each of the four embedded DRAM devices may not arrive at the same time because of line delays caused by temperature increase or some other disturbances. Thus, it is desirable to provide a method and apparatus to ensure that data from each of the four embedded DRAM devices can be arrived at the processor simultaneously.

Figure 1:
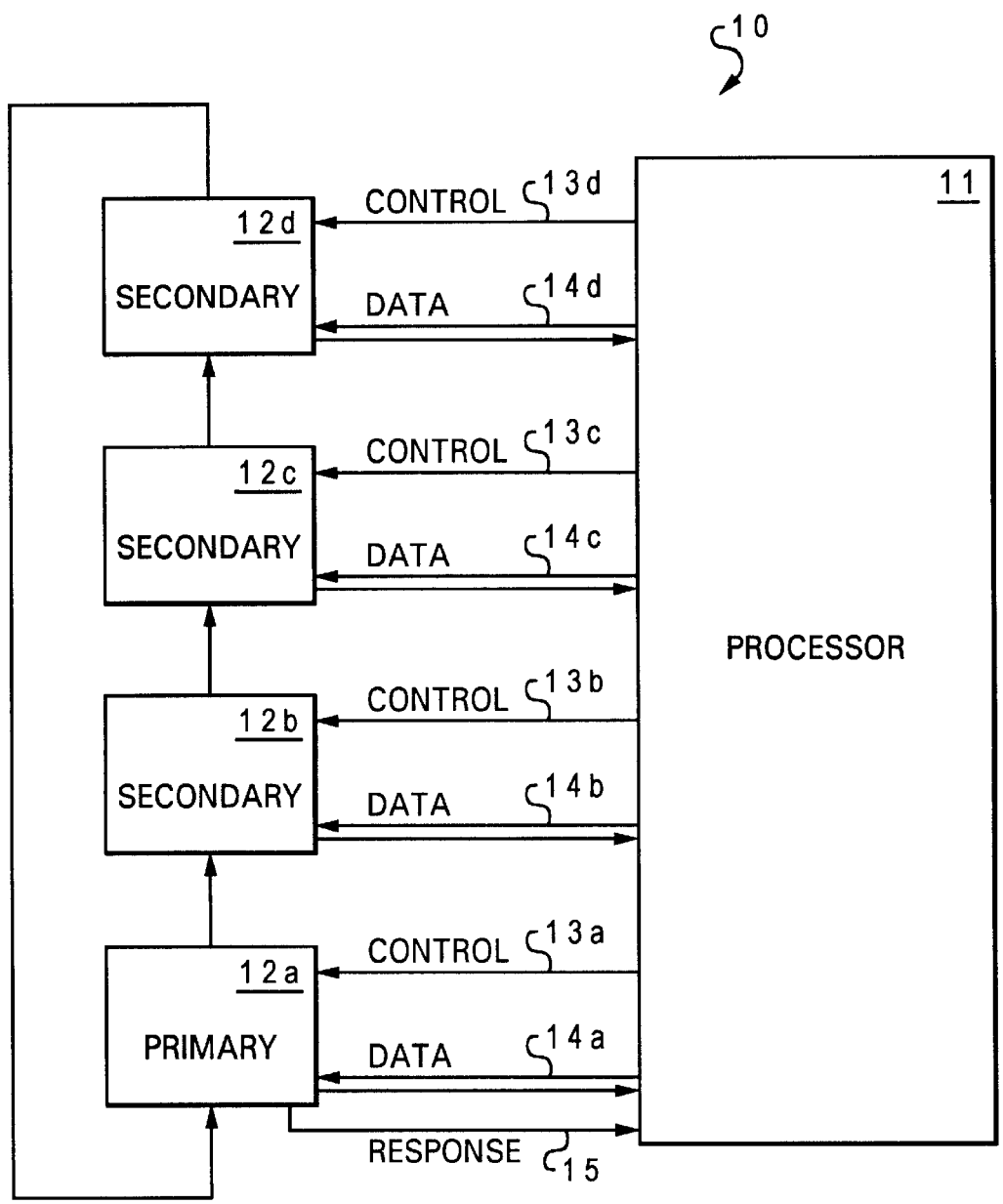
FIG. 1 is a block diagram of a data processing system having multiple embedded DRAM devices, in accordance with a preferred embodiment of the present invention.

Referring now to the drawings and in particular to FIG. 1, there is depicted a block diagram of a data processing system having multiple embedded DRAM devices, in accordance with a preferred embodiment of the present invention. As shown, a data processing system 10 includes a processor 11 coupled to embedded DRAM devices 12a–12d. Each of embedded DRAM devices 12a–12d is controlled by processor 11 via control lines 13a–13d, respectively. Similarly, data communications are provided between each of embedded DRAM devices 12a–12d and processor 11 via data buses 14a–14d, respectively. In this example, embedded DRAM device 12a is denoted as a primary embedded DRAM device while embedded DRAM devices 12b–12d are denoted as secondary embedded DRAM devices. As the primary embedded DRAM device, embedded DRAM device 12a is responsible to communicate data transfer status to processor 11 via a response bus 15. Each of embedded DRAM devices 12b–12d is also equipped with a separate response bus, but those response buses are preferably left unconnected.

Figure 2:
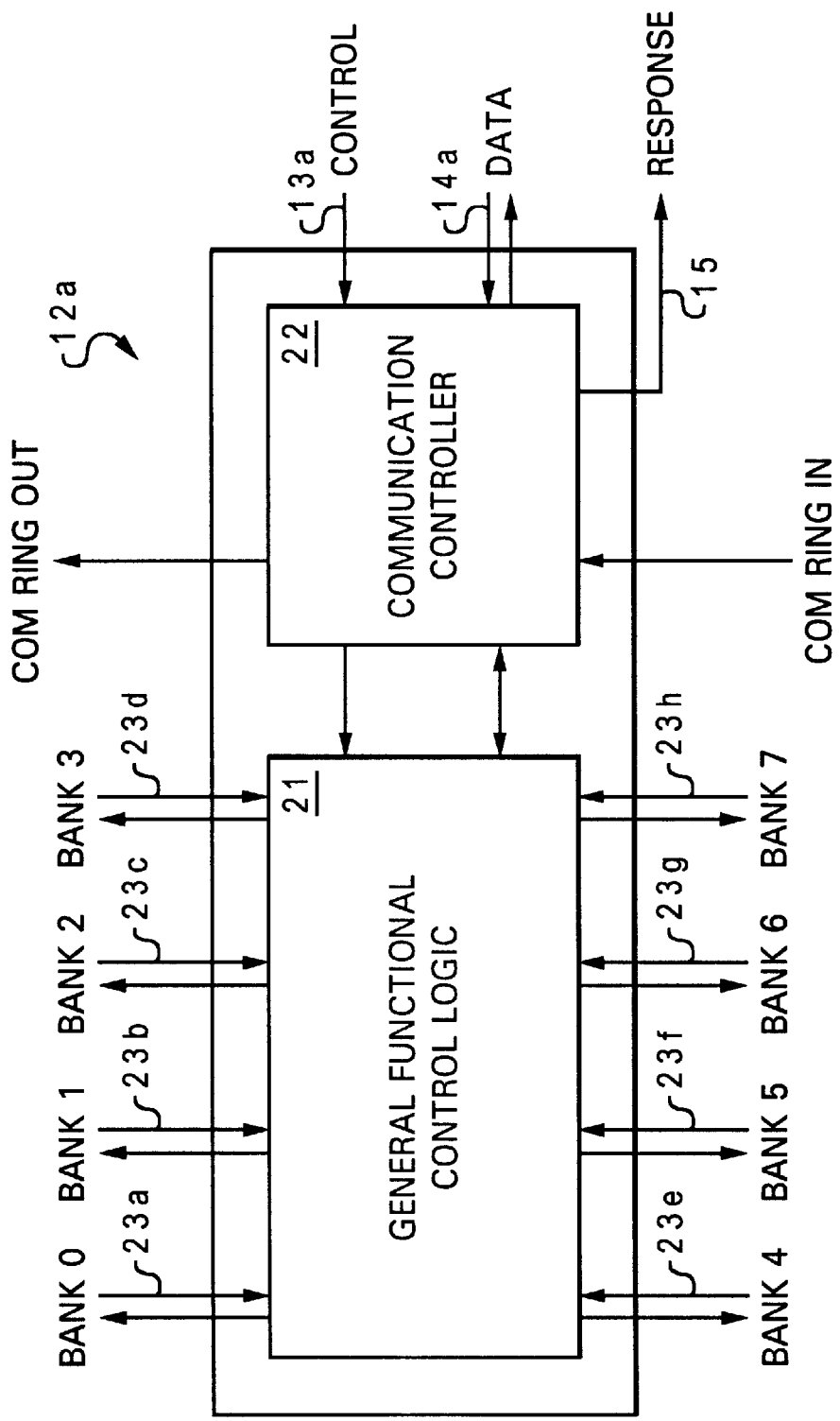
FIG. 2 is a block diagram of one of the embedded DRAM devices within the data processing system from FIG. 1, in accordance with a preferred embodiment of the present invention.

With reference now to FIG. 2, there is illustrated a block diagram of one of embedded DRAM devices 12a–12d from FIG. 1, in accordance with a preferred embodiment of the present invention. Using embedded DRAM device 12a as an example, embedded DRAM device 12a includes a general function control logic 21 and a communication controller 22. General function control logic 21 includes multiple sets of data buses 23a–23h. Each set of data buses 23a–23h is connected to a corresponding bank of memories within embedded DRAM device 12a, as is well-known to those skilled in the art. In this example, embedded DRAM device 12a has a total of eight banks of memories, from bank 0 to bank 7. Communication controller 22 synchronizes data transfers between an embedded DRAM device, such as embedded DRAM device 12a, and all other connected embedded DRAM devices, such as embedded DRAM devices 12b–12d, and processor 11.

Figure 3:
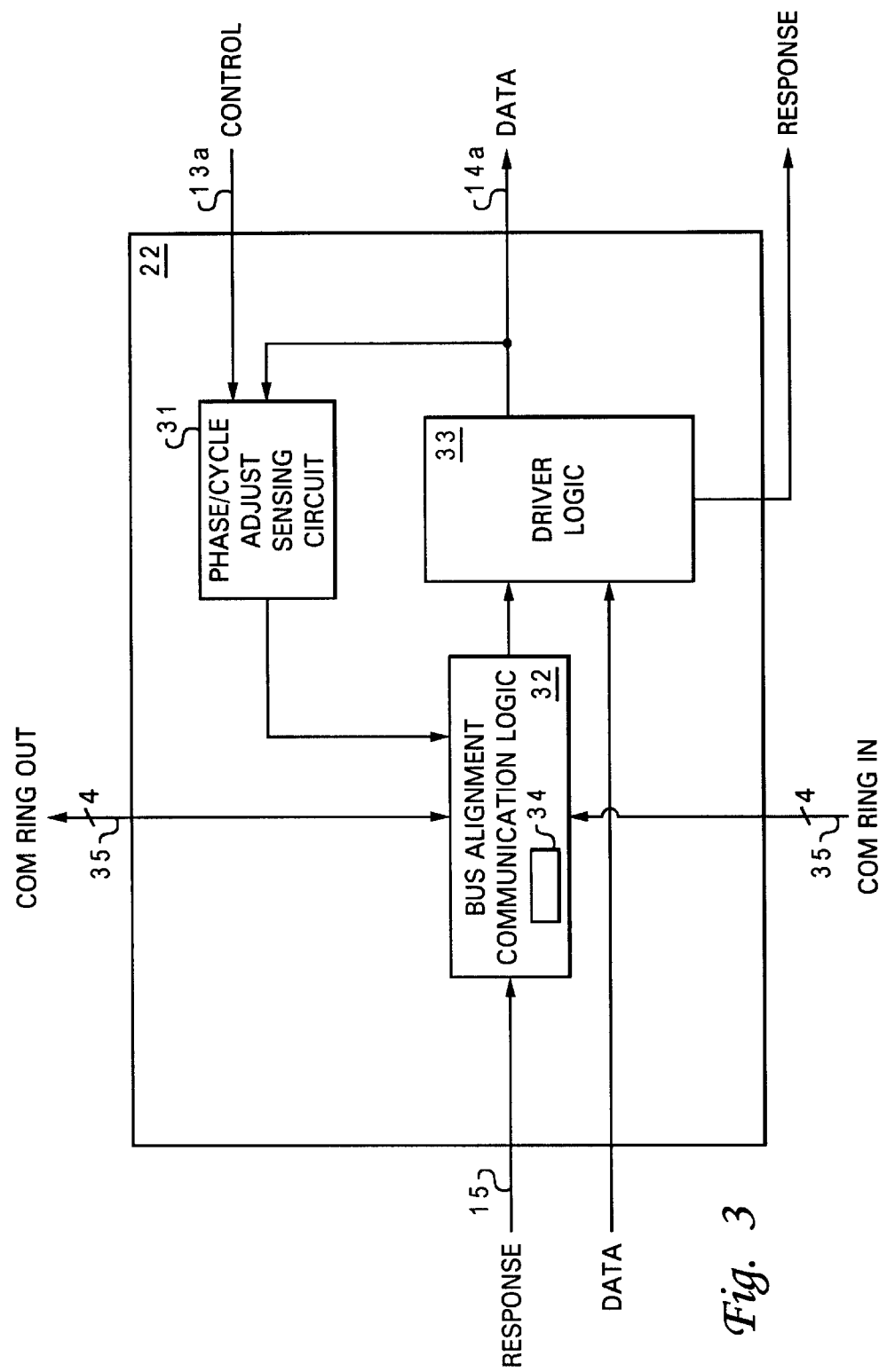
FIG. 3 is a block diagram of a communication controller within the embedded DRAM device from FIG. 2, in accordance with a preferred embodiment of the present invention.

Referring now to FIG. 3, there is illustrated a detailed block diagram of communication controller 22 within embedded DRAM device 12a from FIG. 2, in accordance with a preferred embodiment of the present invention. As shown, communication controller 22 includes a phase/cycle adjust sensing circuit 31, a bus alignment communication logic block 32, and a driver logic block 33. Phase/cycle adjust sensing circuit 31 monitors response signals on response bus 15 as well as data being driven out of embedded DRAM 12a from driver logic block 33 (to processor 11 in FIG. 1). Bus alignment communication logic block 32 includes a mode register 34 for indicating the identification number (ID no.) of an embedded DRAM device to which mode register 34 belongs. For example, an ID no. "0" may be assigned to embedded DRAM device 12a, an ID no. "1" may be assigned to embedded DRAM device 12b, an ID no. "2" may be assigned to embedded DRAM device 12c, and an ID no. "3" may be assigned to embedded DRAM device 12d. Based on the assigned ID numbers, bus alignment communication logic block 32 can update a corresponding line of a communication ring bus 35 connecting all embedded DRAM devices 12a–12d, as necessary. In the present example, communication ring bus 35 is preferably four lines wide, and each line corresponds to one of four embedded DRAM devices 12a–12d. Similarly, response bus 15 is at least four lines wide, and each of the four lines corresponds to one of four embedded DRAM devices 12a12d.

Figure 4:
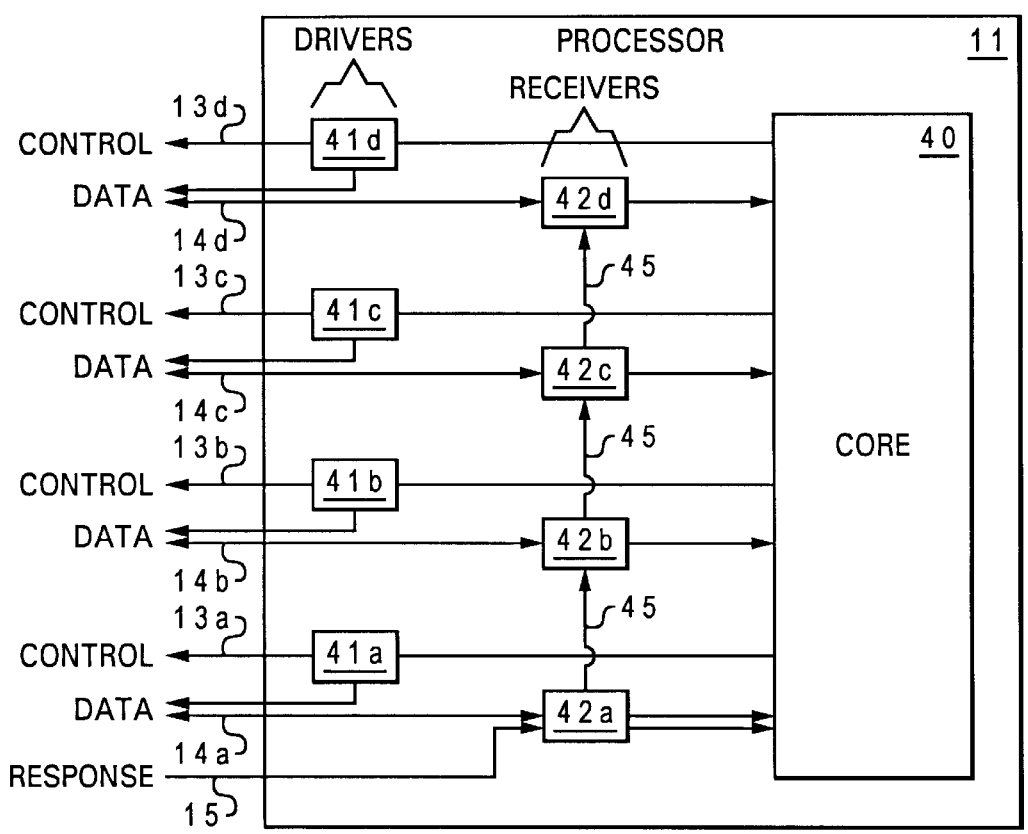
FIG. 4 is a block diagram of a block diagram of the processor from FIG. 1 for controlling multiple embedded DRAM devices, in accordance with a preferred embodiment of the present invention.

With reference now to FIG. 4, there is depicted a detailed block diagram of processor 11 for controlling embedded DRAM devices 12a–12d, in accordance with a preferred embodiment of the present invention. As shown, processor 11 includes a processor core 40 having various logic circuits for processing data, a set of drivers 41a–41dfor driving control signals through control lines 13a–13d, respectively, and a set of receivers 42a–42d for driving data signals through data buses 14a–14d, respectively. In the present example, receiver 42a is denoted as a primary receiver while receivers 42b–42d are denoted as secondary receivers. As the primary receiver, receiver 42a is responsible to receive data transfer status from the primary embedded DRAM device (i.e., embedded DRAM device 12a from FIG. 1) via response bus 15. Receivers 42a–42d may communicate with each other via a communication channel 45.

Figure 5:
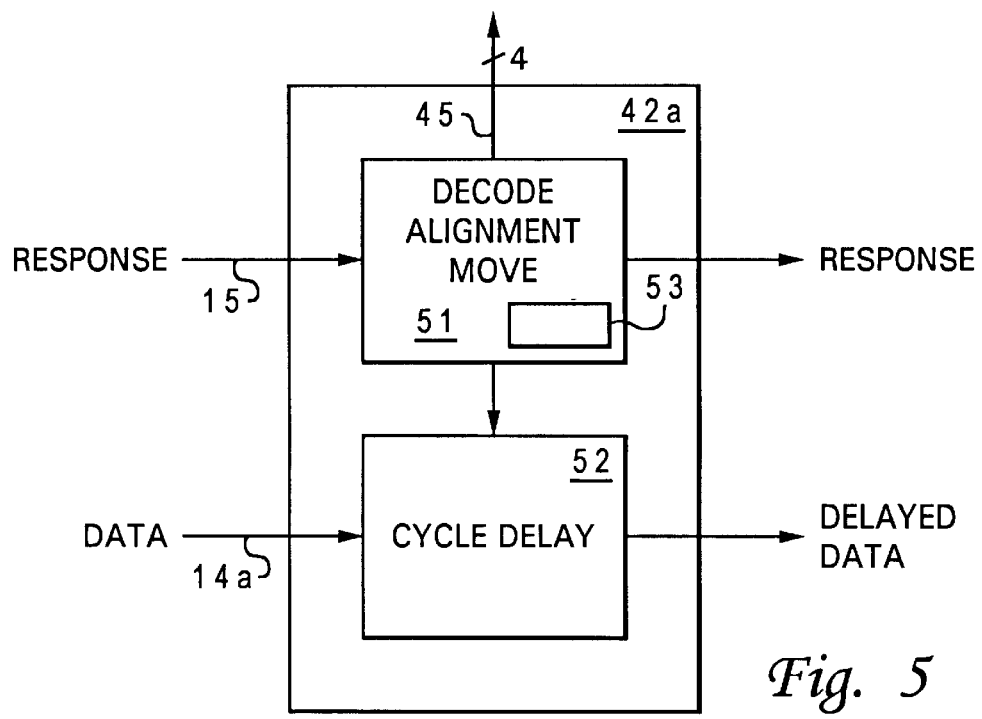
FIG. 5 is a block diagram of a primary receiver within the processor from FIG. 4, in accordance with a preferred embodiment of the present invention.

Referring now to FIG. 5, there is depicted a detailed block diagram of primary receiver 42a from FIG. 4, in accordance with a preferred embodiment of the present invention. As shown, primary receiver 42a includes a decode alignment move block 51 and a cycle delay block 52. Decode alignment move block 51 includes a mode register 53 for indicating the ID no. of an embedded DRAM device to which primary receiver 42a is coupled. Decode alignment move block 51 detects any occurrence of a cycle adjustment in embedded DRAM device 12a, and cycle delay block 52 provides a cycle delay on incoming data from embedded DRAM device 12a, as will be further explained infra.

Figure 6:
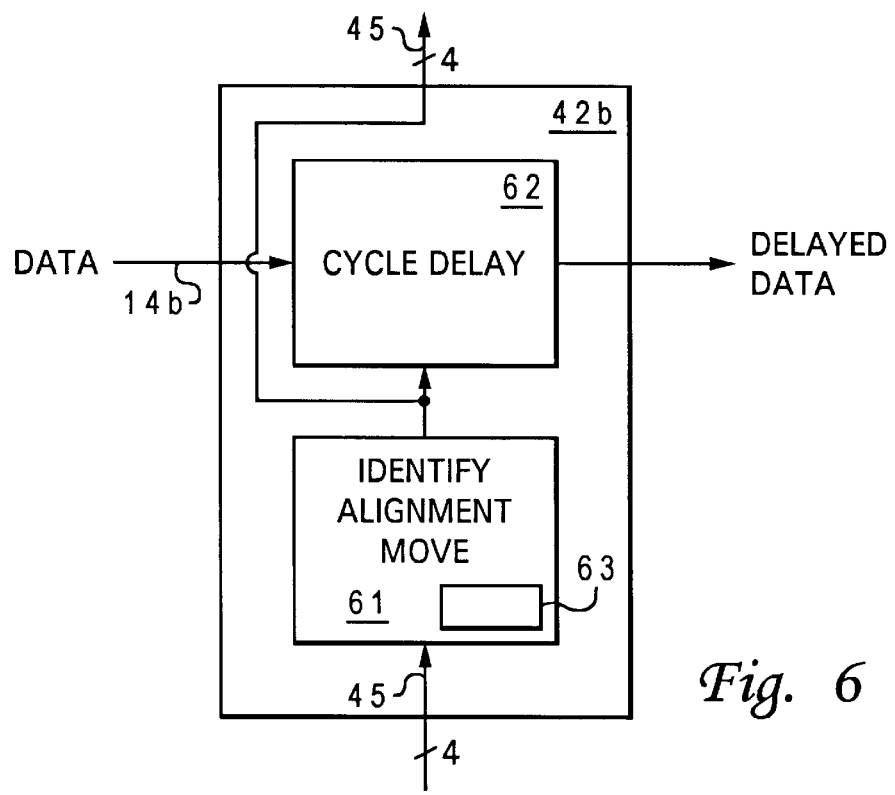
FIG. 6 is a block diagram of a secondary receiver within the processor from FIG. 4, in accordance with a preferred embodiment of the present invention.

With reference now to FIG. 6, there is depicted a detailed block diagram of secondary receiver 42b from FIG. 4, in accordance with a preferred embodiment of the present invention. As shown, secondary receiver 42b includes an identify alignment move block 61 and a cycle delay block 62. Identify alignment move block 61 includes a mode register 63 for indicating the ID no. of an embedded DRAM device to which secondary receiver 42b is coupled. Identify alignment move block 61 detects any occurrence of a cycle adjustment in embedded DRAM device 12b, and cycle delay block 62 provides a cycle delay on incoming data from embedded DRAM device 12b, as will be further explained infra.

Sometimes a need for a cycle adjustment (i.e., a delay or an alignment move) may occur in one of embedded DRAM devices 12a–12d. The occurrence of a cycle adjustment in embedded DRAM device 12a can be initially detected by decode alignment move block 51 within primary receiver 42a. The occurrence of a cycle adjustment in any one of embedded DRAM devices 12b–12d can be detected by an identify alignment move block within a corresponding secondary receiver, such as identify alignment move block 61 in an associated one of secondary receivers 42b–42d. The information of the occurrence of a cycle adjustment are then sent from an embedded DRAM device to a corresponding receiver in the processor. The receiver that had received the occurrence of a cycle adjustment informs the other receivers (in the processor) that did not receive the occurrence of a cycle adjustment to use their cycle delay block to delay the incoming data for at least one cycle.

Figures 7A, 7B:
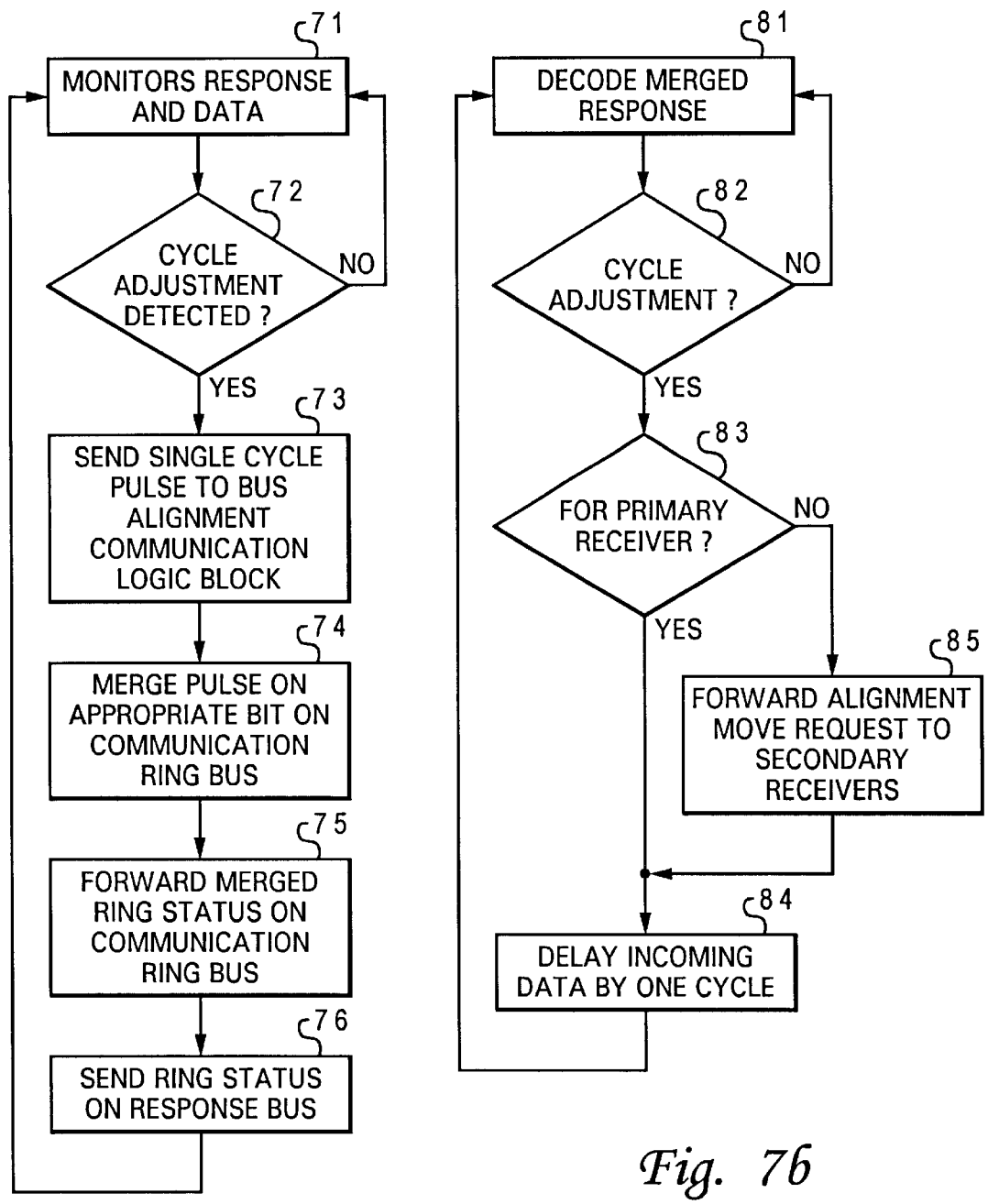
FIGS. 7a–7b are high-level logic flow diagrams depicting a method for providing concurrent communication between multiple embedded DRAM devices and a processor, in accordance with a preferred embodiment of the present invention.

Referring now to FIGS. 7a–7b, there are illustrated several high-level logic flow diagrams depicting a method for providing concurrent communication between multiple embedded DRAM devices and a processor, in accordance with a preferred embodiment of the present invention. Within each embedded DRAM device, a phase/cycle adjust sensing circuit, such as phase/cycle adjust sensing circuit 31 from FIG. 3, monitors a response signal and data being driven out of the embedded DRAM from a driver logic block, such as driver logic block 33 from FIG. 3, to a processor, such as processor 11 from FIG. 1, as shown in block 71. The phase/cycle adjust sensing circuit may monitor the ramp rate of the data being driven out of a corresponding driver logic block. Based on the ramp rate, the phase/cycle adjust sensing circuit determines whether or not a cycle adjustment has occurred, as depicted in block 72. For example, a driver logic block of within one of the embedded DRAM devices may have a problem in driving data out to the processor because of temperature increase or some other disturbances (as a result, its ramp rate is slower than normal), and a cycle adjustment is needed. If a cycle adjustment has been detected, the phase/cycle adjust sensing circuit sends a single cycle pulse to a bus alignment communication logic block of the embedded DRAM device, such as bus alignment communication logic block 32 in FIG. 3, as shown in block 73. The bus alignment communication logic block merges the pulse on the appropriate line location of a communication ring bus, such as communication ring bus 35 from FIG. 3, to generate a merged communication ring status, as depicted in block 74. The bus alignment communication logic block then forwards the merged communication ring status on the communication ring bus, as shown in block 75, such that all embedded DRAM device will aware of the cycle adjustment. Next, the bus alignment communication logic block sends the merged communication ring status onto the driver logic block, and the driver logic block then drives the merged communication ring status to the processor via a response bus, such as response bus 15, as depicted in block 76.

As mentioned previously, each embedded DRAM device is assigned with an ID no. For example, an ID no. "0" is assigned to embedded DRAM device 12a, an ID no. "1" is assigned to embedded DRAM device 12b, an ID no. "2" is assigned to embedded DRAM device 12c, and an ID no. "3" is assigned to embedded DRAM device 12d. The same assignment also applies to each line on communication ring bus 35 and response bus 15. For example, line 0 of communication ring bus 35 and response bus 15 correspond to embedded DRAM device 12a, line 1 of communication ring bus 35 and response bus 15 correspond to embedded DRAM device 12b, etc. Based on the above-mentioned assigned ID numbers, the bus alignment communication logic block may provide the cycle adjustment information to other embedded DRAM devices and to the receivers within the processor by updating the corresponding line of communication ring bus 35 and response bus 15.

In the present embodiment, the bus alignment communication logic block communicates the information of an occurrence of a cycle adjustment within an embedded DRAM device in the form of the above-mentioned merged communication ring status to other embedded DRAM devices via the communication ring bus 35 and to the processor via response bus 15, as follows. A logical "1" in a line within communication ring bus 35 and response bus 15 imply a cycle adjustment has occurred in the embedded DRAM device associated with that line, and a logical "0" in a line within communication ring bus 35 and response bus 15 imply no cycle adjustment has occurred in the embedded DRAM device associated with that line. For example, a logical "0," "1," "0, and "0" in lines 0, 1, 2, and 3, respectively, within communication ring bus 35 and response bus 15 imply a cycle adjustment has occurred in embedded DRAM device 12b only. As another example, a logical "1," "0," "1," and "0" in lines 0, 1, 2, and 3, respectively, within communication ring bus 35 and response bus 15 imply cycle adjustments have occurred in embedded DRAM devices 12a and 12c.

The merged response from embedded DRAM device 12a is seen only by the primary receiver, such as primary receiver 42a from FIG. 4. Within the primary receiver, the merged response is decoded, as shown in block 81. A determination is then made as to whether or not a cycle adjustment has been detected for any of the receivers, such as receivers 42a–42d, as depicted in block 82. If a cycle adjustment has been detected, another determination is made as to whether or not the cycle adjustment is for the primary receiver, as shown in block 83. If the cycle adjustment is for the primary receiver, then the decode alignment move block within the primary receiver, such as decode alignment move block 51 from FIG. 5, sends a single cycle pulse to a cycle delay block in all the secondary receivers, such as cycle delay block 61 from FIG. 6, to delay the incoming data by one cycle, as depicted in block 84.

Otherwise, if the cycle adjustment is not for the primary receiver, then an alignment move request is forward to the appropriate secondary receiver on communication channel 45, as shown in block 85. The appropriate secondary receiver would be the secondary receiver having a cycle adjustment occurred at its associated embedded DRAM device. Within the appropriate secondary receiver, an identify alignment move block, such lay as identify alignment move block 62 from FIG. 6, sends a single cycle pulse to the cycle delay block in the primary receiver and to the cycle delay block in the remaining secondary receivers to delay the incoming data by one cycle, as depicted in block 84.

If a cycle adjustment occurred in only one of the four embedded DRAM devices, then the incoming data in the remaining three embedded DRAM devices will be delayed by one cycle. If cycle adjustments occurred in two of the four embedded DRAM devices, then the incoming data in the remaining two embedded DRAM devices will be delayed by one cycle. If cycle adjustments occurred in all four embedded DRAM devices, then no delay in the incoming data will be necessary.

As has been described, the present invention provides a method and apparatus for concurrently communicating with multiple embedded DRAM devices. Although data are shown to be driven from embedded DRAM devices to a processor, it is understood by those skilled in the art that the present invention is also applicable to data driven from the processor to the embedded DRAM devices. Furthermore, even though embedded DRAM devices are used to illustrate the present invention, it is understood by those in the art that the present invention can also be utilized in other similar memory devices such as DRAM devices.

While the invention has been particularly shown and described with reference to a preferred embodiment, it will be understood by those skilled in the art that various changes in form and detail may be made therein without departing from the spirit and scope of the invention.

What is claimed is:

1. An apparatus for providing concurrent communications between a plurality of memory devices and a processor, said apparatus comprising:
    a phase/cycle adjust sensing circuit within each of said plurality of memory devices, wherein each of said phase/cycle adjust sensing circuits detects an occurrence of a cycle adjustment from a corresponding memory device;
    a bus alignment communication logic, within each of said plurality of memory devices, for communicating said occurrence of a cycle adjustment to said processor;
    a plurality of receivers within said processor, each receiver connected to receive data from a respective one of said plurality of memory devices; and
    a cycle delay block, within each of said receivers, for delaying incoming data for at least one cycle, wherein said delaying occurs at any receiver that does not receive a notice of said occurrence of a cycle adjustment.

2. The apparatus of claim 1, wherein said plurality of memory devices are embedded dynamic random access memory (DRAM) devices.

3. The apparatus of claim 1, wherein bus alignment communication logic further communicates said occurrence of a cycle adjustment to other bus alignment communication logic within said plurality of memory devices.

4. The apparatus of claim 1, wherein said plurality of memory devices are connected to each other in a ring configuration.

5. The apparatus of claim 1, wherein said plurality of receivers within said processor communicates said occurrence of a cycle adjustment to each other via a communication channel.

6. A data processing system comprising:

a processor;

a plurality of memory devices coupled to said processor, wherein each of said plurality of memory devices includes a phase/cycle adjust sensing circuit within each of said plurality of memory devices, wherein each of said phase/cycle adjust sensing circuit detects an occurrence of a cycle adjustment from a corresponding memory device;

a bus alignment communication logic, within each of said plurality of memory devices, for communicating said occurrence of a cycle adjustment to said processor;

a plurality of receivers within said processor each receiver connected to receive data from a respective one of said plurality of memory devices; and a cycle delay block, within each of said receivers, for delaying incoming data for at least one cycle, wherein said delaying occurs at any receiver that does not receive a notice of said occurrence of a cycle adjustment.

7. The data processing system of claim 6, wherein said plurality memory devices are embedded dynamic random access memory (DRAM) devices.

8. The data processing system of claim 6, wherein bus alignment communication logic further communicates said occurrence of a cycle adjustment to other bus alignment communication logic within said plurality of memory devices.

9. The data processing system of claim 6, wherein said plurality of memory devices are connected to each other in a ring configuration.

10. The data processing system of claim 6, wherein said plurality of receivers within a said processor communicates said occurrence of a cycle adjustment to each other via a communication channel.

11. A method for providing concurrent communications between a plurality of memory devices and a processor, said method comprising:

detecting an occurrence of a cycle adjustment at one of said plurality of memory devices;

communicating said occurrence of a cycle adjustment at one of said plurality of memory devices to said processor; and delaying incoming data to said processor for at least one cycle from any remaining memory devices that did not have said occurrence of a cycle adjustment.

12. The method of claim 11, wherein said plurality of memory devices are embedded dynamic random access memory (DRAM) devices.

13. The method of claim 11, wherein said method further includes communicating said occurrence of a cycle adjustment to all of said plurality of memory devices.

14. The method of claim 13, wherein said communicating is performed by a bus alignment communication logic within each of said plurality of memory devices.

15. The method of claim 11, wherein said detecting is performed by a phase/cycle adjust sensing circuit within each of said plurality of memory devices.

16. The method of claim 11, wherein said method further includes connecting said plurality of memory devices in a ring configuration.

* * * * *

UNITED STATES PATENT AND TRADEMARK OFFICE
CERTIFICATE OF CORRECTION

PATENT NO.    : 6,574,719 B2                                                Page 1 of 1
DATED         : June 3, 2003
INVENTOR(S)   : Ravi Kumar Arimilli et al.

It is certified that error appears in the above-identified patent and that said Letters Patent is hereby corrected as shown below:

Column 7,
Line 26, please insert the word -- of -- between the words "plurality" and "memory".

Signed and Sealed this

Fourth Day of November, 2003

JAMES E. ROGAN
*Director of the United States Patent and Trademark Office*